Aug. 16, 1938.   H. A. VAN DYKE   2,126,981
CONTROL APPARATUS
Filed March 12, 1937

INVENTOR
Henry A. Van Dyke
BY
Warren H. F. Schmieding
ATTORNEY

Patented Aug. 16, 1938

2,126,981

UNITED STATES PATENT OFFICE 2,126,981

CONTROL APPARATUS

Henry A. Van Dyke, Columbus, Ohio, assignor to Ranco Incorporated, Columbus, Ohio, a corporation Application March 12, 1937, Serial No. 130,577

5 Claims. (Cl. 175—320)

My present invention relates to control systems for energy translating devices, and more particularly to electrical control systems for sequentially energizing a plurality of energy translating devices.

One of the objects of my present invention is to provide a control system for sequentially energizing a plurality of energy translating devices, which system includes a thermostatic timing mechanism, that is heated by the current traversing one of the energy translating devices, this passage of current causing the timing mechanism to operate a switch for energizing a second energy translating device.

In carrying out the aforementioned object it is a further object of my invention to provide the timing mechanism with a shunting switch, which is operated subsequent to the closure of the motor switch, that will be operated intermittently by the timing mechanism to open and close a shunt circuit for maintaining the timing mechanism at a substantially constant temperature.

A further object of the present invention is to provide a control system for energy translating devices, which system causes energization of the devices sequentially, by means of an electrically heated timing mechanism which provides sufficient delay in the energization of one of the energy translating devices to allow the surge current, which is developed on the initial energization of another of the energy translating devices, to diminish before the first mentioned device can be energized.

Other and further objects and advantages will be apparent from the following description, reference being had to the accompanying drawing wherein a preferred form of embodiment of the present invention is clearly shown.

Figure 1:
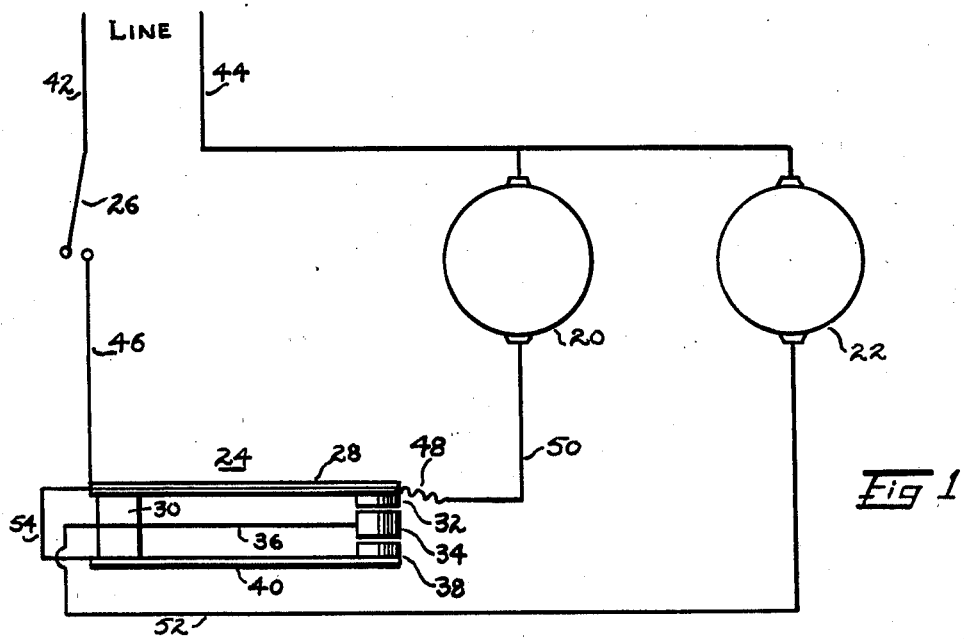
Fig. 1 is a diagrammatic view of the circuit used to control the sequential starting of two translating devices.

A preferred embodiment of my present invention is shown in Fig. 1, wherein the translating devices, for illustrative purpose, are shown as two motors 20 and 22. These motors are connected to the line through a thermostatic time delay switch 24. A main switch 26 controls the starting of the motor 20, whereas the thermostatic switch 24 controls the starting of motor 22. The thermostatic switch 24 includes a thermostat in the form of a bimetallic strip 28, which strip 28 is fixedly mounted at one end thereof to a dielectric block 30. The opposite or free end of the strip 28 carries a contact 32. The contact 32 is disposed to engage a contact 34 when the thermostat 28 is deflected downwardly, due to heating of the strip 28. Contact 34 is yieldingly carried at one end of a spring strip 36 which is mounted fixedly at the other end thereof to the block 30. The contact 34 on spring strip 36 is also disposed to engage contact 38 when displaced downwardly by deflection of the bimetallic strip 28. The contact 38 is carried at one end of a rigid member 40, of conductive material, which is fastened at the opposite end thereof to the dielectric member 30.

Figure 2:
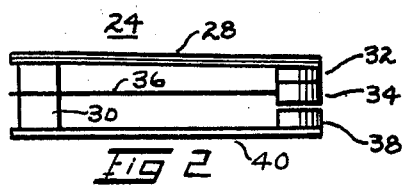
Fig. 2 shows the thermostatic switch in position for circuit closure of the second translating device.
Figure 3:
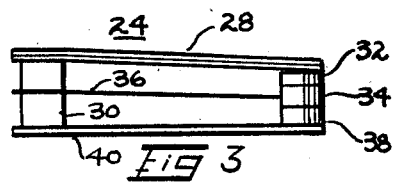
Fig. 3 shows the thermostatic switch in shunting position.

The operation of the system may be explained as follows: Current is supplied to the system from the line through wires 42 and 44, wire 44 connects to one terminal of each of the motors 20 and 22. The wire 42 connects to one pole of the switch 26, the other pole of switch 26 being connected by wire 46 to the terminal end of the bimetallic strip 28. Thus when the switch 26 is closed, current traverses wire 46, bimetallic strip 28, flexible connection 48, wire 50 to the other side of the motor 20. In this manner the motor 20 is energized to start immediately at the closure of the switch 26. Operation of the motor 20 causes current to traverse the bimetallic strip 28, which due to the resistance of the strip 28, causes the same to be heated. Heating of the bimetallic strip 28 results in a deformation, or deflection of the strip, which carries the associated contact 32 downwardly until it engages contact 34. At this instant, current flows from the strip 28 through contacts 32 and 34, strip 36, wire 52, to the other side of the motor 22, to energize the motor 22. The described position of the switch 24 is illustrated in Fig. 2. The energization of motor 22 causes an increased current to flow through the bimetallic strip 28 which increases the heating effect of the strip 28. This causes more rapid downward deflection of the strip 28 until contact 34 engages contact 38. In this position, a shunt circuit is established through the member 40 and wire 54, which causes the current from wire 46 to traverse wire 54, member 40, contact 38, and contact 34, at which point the current divides part passing through contact 32, flexible connection 48, wire 50 to the motor 20 and the other part of the current passing through spring strip 36, wire 52 to the motor 22. The current follows the shunt path since the resistance of the shunt path is considerably less than the resistance of the bimetallic strip 28. Theoretically, some current still traverses the strip 28, but this current is insufficient to cause any marked heating effect on the strip. Thus when the thermostat 24 is in the position shown in Fig. 3, the thermostatic strip 28 is shunted out of the circuit which allows the same to cool until contacts 34 and 38 separate, to again assume the position shown in Fig. 2. At the instant of separation of the contacts 34 and 38, the current again passes through the bimetallic strip 28 to cause the strip to be reheated and deflect and again perform the above mentioned cycle of shunting. From the foregoing it will be noted that the shunt path around the thermostat 28 is alternately energized and deenergized constituting a cyclic operation during the entire operating period of the motors 20 and 22.

Figure 4:
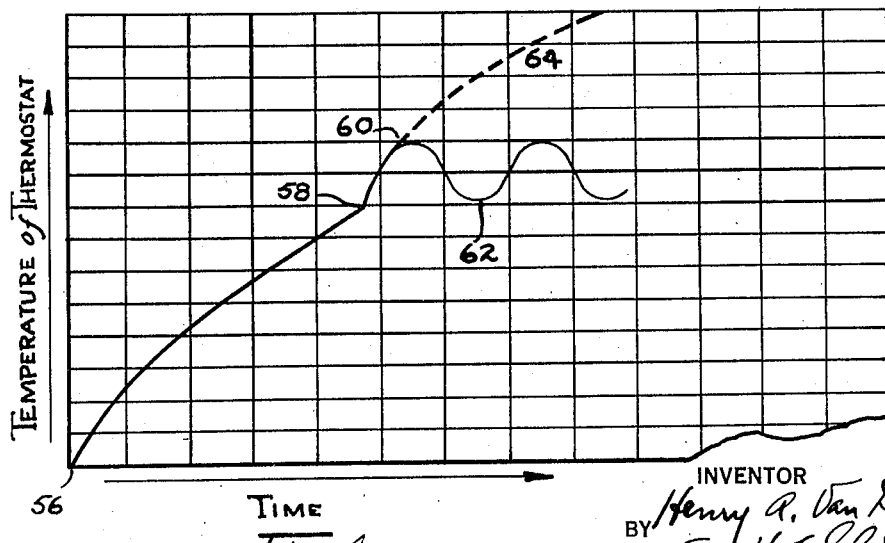
Fig. 4 is a chart showing the temperature of the thermostat with respect to time.

The chart in Fig. 4 diagrammatically illustrates the temperature of the thermostatic strip 38 with respect to time. Referring to the chart, point 56 represents the instant that switch 26 is closed to start the motor 20. From this point 56 the thermostat increases in temperature up to a point 58 where the contacts assume the position shown in Fig. 2. Since the current passing through the strip 28 is increased, the rate of heating of the strip is accelerated to point 60. It is at the point 60 that the thermostatic switch 24 assumes the position of Fig. 3, which causes the temperature of the bimetallic strip to decrease to the point 62, at which point 62 the shunt path is broken to again allow the thermostat to be reheated. The succeeding high and low points of the curve are cycles similar to the one just explained. The difference in temperature between the points 60 and 62 is exaggerated to illustrate the principle of operation. Actually this difference in temperature is very slight and may be considered substantially constant. It will be noted that original heating curve of the bimetallic strip, as represented by the dotted line at 64, would increase in temperature to a very high value if the shunt path was not provided. Thus the present invention provides a thermostatic device 24 which maintains its temperature at a substantially constant value just above the temperature required to operate the switches included in the device 24. Due to this cyclic operation which maintains the temperature of the thermostat 28 slightly above its operating temperature, it is possible to obtain very rapid separation of contacts 32 and 34 when the system is deenergized by the opening of switch 26. The separation of contacts 32 and 34 assures sequential starting of the motors 20 and 22 on subsequent closure of switch 26. It has been found by tests that if the switch 26 is allowed to remain open for a period of a few seconds, the circuit to motor 22 is broken. It is apparent that the timing or operating periods between closure of the various contacts may be varied to obtain any desired results by use of bimetallic strips of varying resistance, etc.

While the foregoing explanation is directed to the starting of two motors in a sequence, any number of motors may be started by a similar system. In the case of a third motor, it is only necessary to place a second thermostatic switch, similar to switch 24, in series with the wire 52. Thus when motor 22 is energized the second time delay switch will be energized to start the third motor after a predetermined period.

A somewhat similar system may be utilized to start a single motor wherein a time delay is desired before the starting of the motor. In this modification a resistor may be placed in line 50 in place of motor 20. It will be noted therefore that motor 22 cannot be started until the thermostatic switch 24 is heated sufficiently to close contacts 32 and 34 which action requires a predetermined period of time to elapse.

Another use of my invention is to prevent too heavy a load from being impressed on a wiring system, for example, if two motors are to be started by a single switch, the wiring is often not sufficiently heavy to carry the necessary current, since the surge current which is present on the initial energization of the motors is too high for the wiring and fuses in the system. With the present system it is possible to start one motor and delay the starting of a second motor until the surge current, caused by the first motor, has diminished, thus subjecting the line to only one surge current during any given period.

The present invention provides an exceedingly simple control system for the sequential starting of a plurality of motors for any purpose. The system as explained constitutes a preferred form of embodiment, however, it is obvious that a heating coil or resistance unit of some other type may be utilized to operate the thermostat 28 rather than allowing the energizing current for the motor to traverse the thermostat 28.

While the form of embodiment of the present invention as herein disclosed constitutes a preferred form, it is to be understood that other forms might be adapted, all coming within the scope of the claims which follow.

I claim:

1. A control system for energizing a plurality of energy translating devices in a sequence comprising, a switch for energizing one of said devices; a second switch operable to energize a second of said devices; electrically heated thermal responsive means affected by the current traversing the said first energy translating device, said thermal responsive means, after a predetermined period, causing said second switch to operate for energizing the second device; and means operated by the thermal responsive means for limiting the temperature of the thermal responsive means and for maintaining said limited temperature at a substantially constant value.

2. A control system for energy translating devices comprising, a plurality of energy translating devices to be energized sequentially; a switch for controlling the energization of one of said devices; a second switch operable for energizing a second of said devices; a third switch; electrically heated thermal responsive means affected by the current traversing the first mentioned translating device for operating said second and third switches in the order named, said third switch completing a shunt circuit around said electrically heated thermal responsive means, whereby the electrical heated thermal responsive means are alternately heated and cooled to maintain said thermal responsive means at a substantially constant temperature.

3. A control system for controlling a plurality of energy translating devices comprising, a switch operable for controlling one of said devices; an electrically heated thermostat adapted to be heated by the energizing current for the first mentioned device; a second switch operable for controlling a second of said devices, said second switch being adapted to be operated by said thermostat, whereby said second device is energized at a time subsequent to the energization of the first mentioned device and after the surge current for the first device has diminished; and a third switch adapted to be operated intermittently by said thermostat, subsequent to the operation of the second switch, for maintaining the said thermostat at a substantially constant temperature.

4. A control system for energizing a plurality of energy translating devices in a sequence comprising, a switch for completing the circuit to one of said devices; a second switch for controlling the operation of another of said devices; an electrically heated thermostat adapted to be heated by the current traversing the first mentioned device, said thermostat when heated being operable for closing the second switch; and a third switch adapted to be operated intermittently by the said thermostat subsequent to the closure of the second switch, for maintaining the thermostat at a substantially constant temperature.

5. A control system for energizing a plurality of energy translating devices in a sequence comprising, a switch for energizing one of said devices; a second switch operable to energize a second of said devices; electrically heated thermal responsive means affected by the current traversing the said first energy translating device, said thermal responsive means, after a predetermined period, causing said second switch to operate for energizing the second device; and means for limiting the temperature of the thermal responsive means between a maximum and minimum during energization of the devices, said limiting means being rendered operative in response to movement of the thermal responsive means.

HENRY A. VAN DYKE.